March 29, 1949. V. VON K. SUNDT 2,465,942
HEADSTOCK CONTROL MECHANISM FOR MACHINE TOOLS
Filed Dec. 18, 1942 9 Sheets-Sheet 1

Vigo von Krogh Sundt
INVENTOR.
BY
ATTORNEY

March 29, 1949.　　V. VON K. SUNDT　　2,465,942
HEADSTOCK CONTROL MECHANISM FOR MACHINE TOOLS
Filed Dec. 18, 1942　　9 Sheets-Sheet 2

Vigo von Krogh Sundt
INVENTOR.

BY Elwin A. Andrus
ATTORNEY.

March 29, 1949. V. VON K. SUNDT 2,465,942
HEADSTOCK CONTROL MECHANISM FOR MACHINE TOOLS
Filed Dec. 18 1942 9 Sheets-Sheet 6

Vigo von Krogh Sundt
INVENTOR.
BY
ATTORNEY.

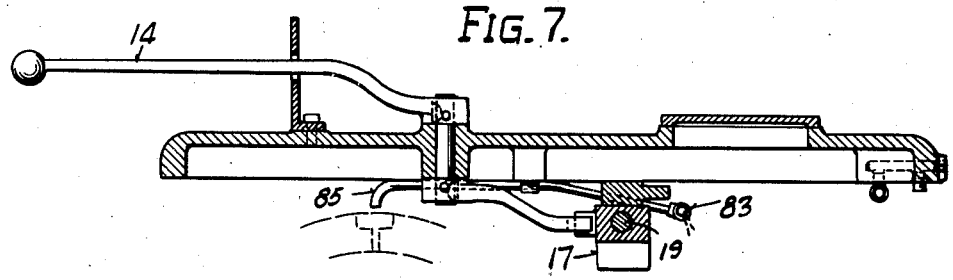
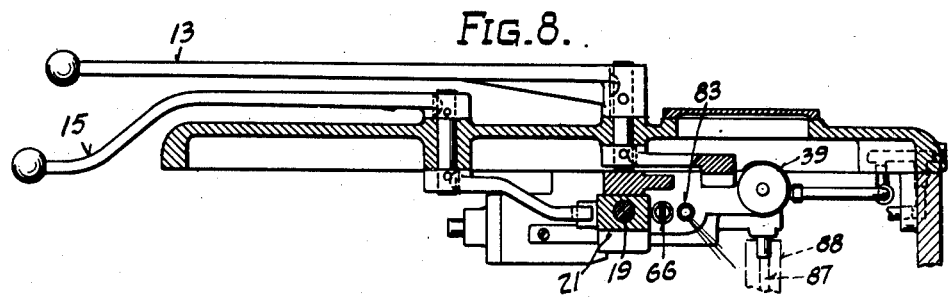
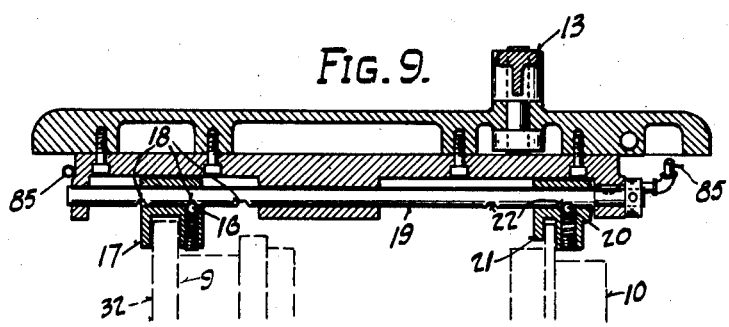
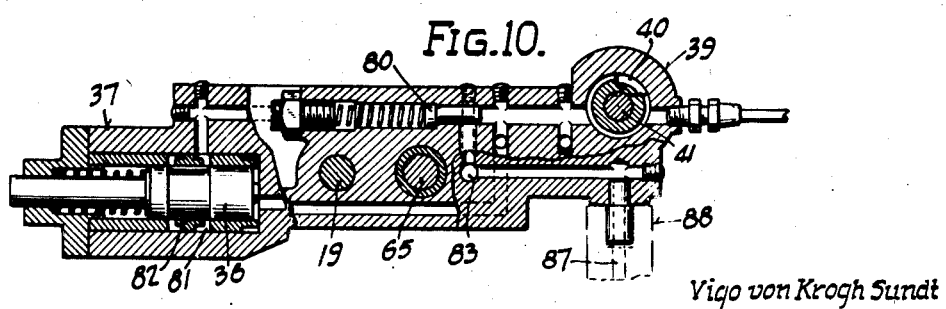

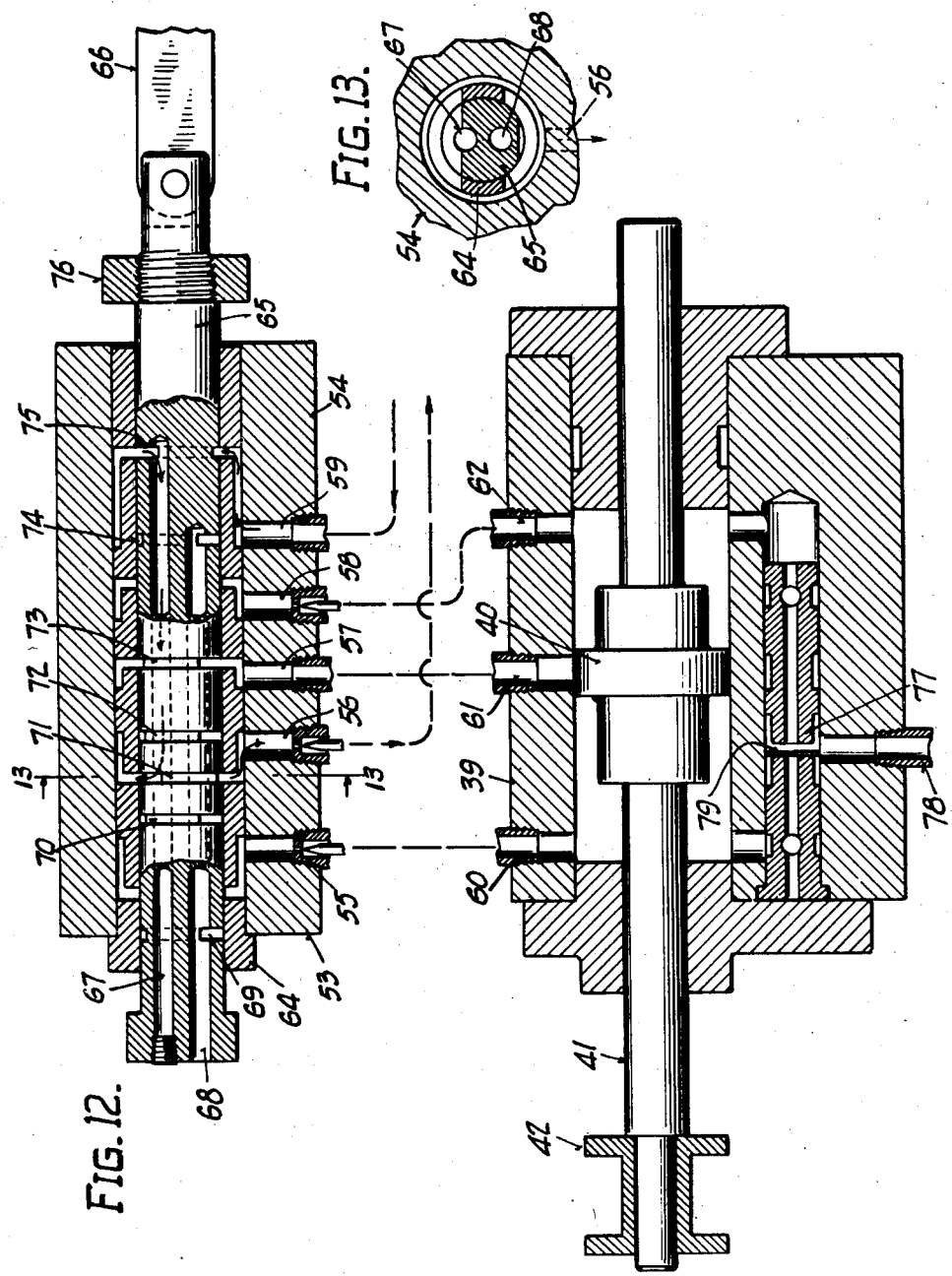

Patented Mar. 29, 1949

2,465,942

UNITED STATES PATENT OFFICE 2,465,942

HEADSTOCK CONTROL MECHANISM FOR MACHINE TOOLS

Vigo von Krogh Sundt, Madison, Wis., assignor to Gisholt Machine Company, Madison, Wis., a corporation of Wisconsin Application December 18, 1942, Serial No. 469,496

10 Claims. (Cl. 192—4)

1

This invention relates to headstock for machine tools such as lathes and the like.

The principal object of the invention is to provide a combined pressure-oiling system and fluid pressure operating mechanism for the clutches and brake contained in the headstock.

A more specific object is to provide a better oiling system for the headstock.

Another object is to provide a simple fluid pressure control for the clutches.

Another object is to provide a fluid pressure actuated brake for a headstock spindle.

Another object is to provide a more efficient oiling system for disc clutches and the like.

Other objects and advantages will appear hereinafter in connection with the specific description of one embodiment of the invention illustrated in the accompanying drawings.

In the drawings:

Fig. 7 is a transverse section through the cover showing the triple gear shifter;

Fig. 8 is a similar section showing the double gear shifter and the high and low clutch operating mechanism;

Fig. 9 is a section on line 9—9 of Fig. 3 showing the shifter locks;

Fig. 10 is a section on line 10—10 of Fig. 3 through the valve control mechanism;

Fig. 12 is an enlarged diagrammatic view of the control valve and forward and reverse clutch operating mechanism; and Fig. 13 is a transverse section on line 13—13 of Fig. 12 showing the detail construction of the control valve.

Figure 1:
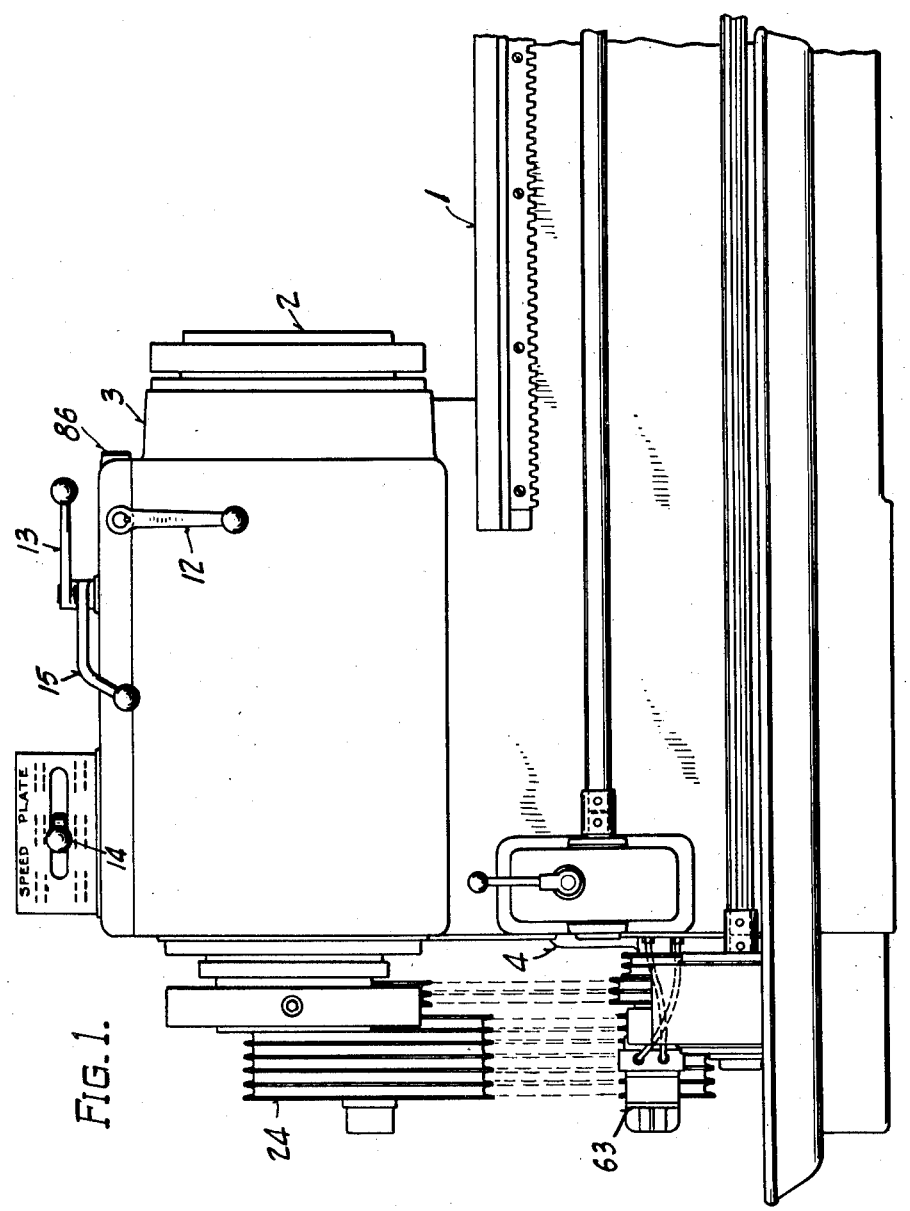
Figure 1 is a side elevation of the headstock of the lathe.

The lathe 1 has a spindle 2 for supporting and rotating the work and which is driven by mechanism within the headstock 3 from a motor 4 mounted on the base of the lathe.

2

The mechanism within the housing of headstock 3 comprises, in general, a forward drive clutch 5, a reverse drive clutch 6, a high speed drive clutch 7, a low speed drive clutch 8, a triple gear shifter transmission 9, and a double gear shifter transmission 10. A brake 11 is mounted on the spindle 2 and serves to secure the same against rotation when the drive is in neutral.

The forward and reverse clutches 5 and 6 are operated hydraulically by lever 12 on the front of the headstock housing and may be self-locking in both open and closed positions. The high and low speed clutches 7 and 8 are operated manually by lever 13 on top of the headstock housing and are self-locking in both open and closed positions. The triple gear shifter 9 is operated by lever 14 on top of the housing. And the double gear shifter 10 is operated by lever 15 on top of the housing. The brake 11 is operated hydraulically in phase relation to the forward and reverse clutches 5 and 6, by lever 12. The levers 13, 14 and 15 respectively are secured to the headstock cover plate and removable therewith.

The gear shifter 9 is locked in position by means of a spring pressed detent 16 in the shifter shoe 17, the detent 16 engaging a recess 18 in the rod 19 upon which shoe 17 is mounted for each respective position of the shifter. Likewise, gear shifter 10 is locked in position by means of a spring pressed detent 20 in the shifter shoe 21, the detent 20 engaging a recess 22 in rod 19 upon which shoe 21 is mounted for each respective position of the shifter.

Figure 2:
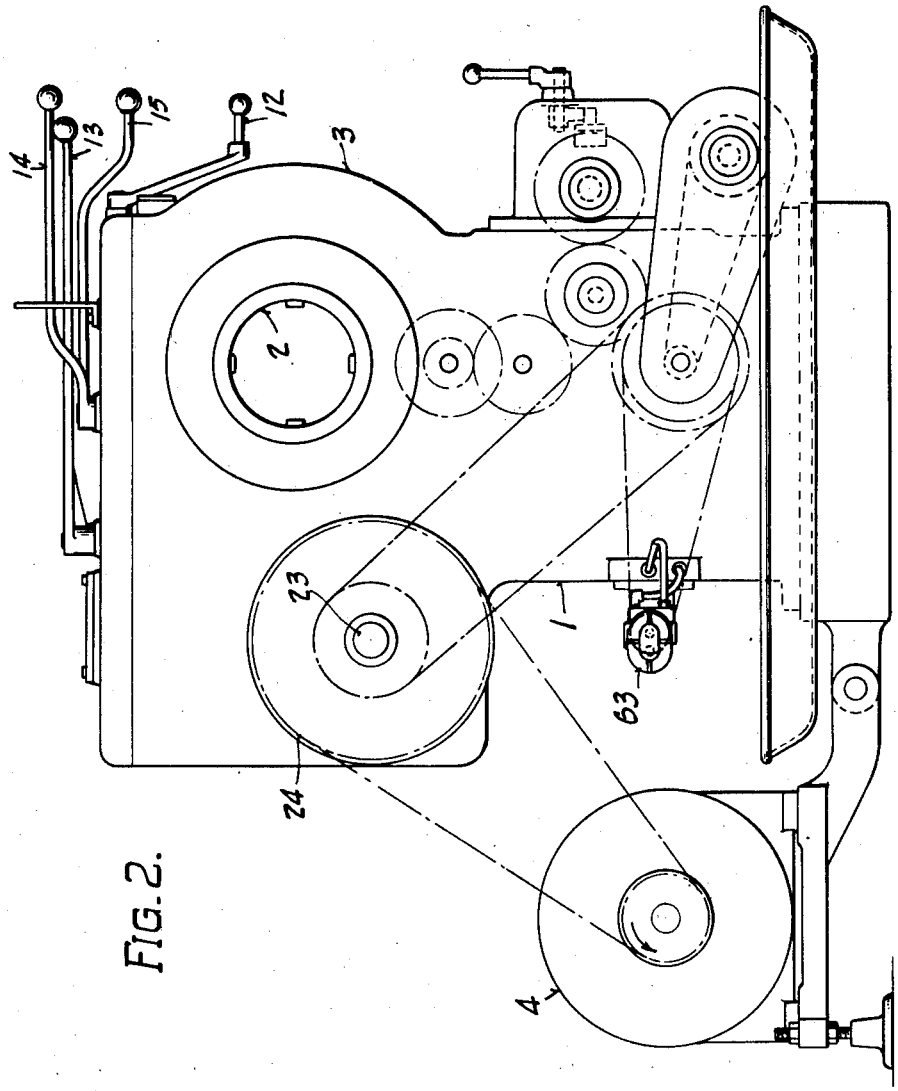
Fig. 2 is an end elevation of the lathe showing the drive and the oil pump.
Figure 3:
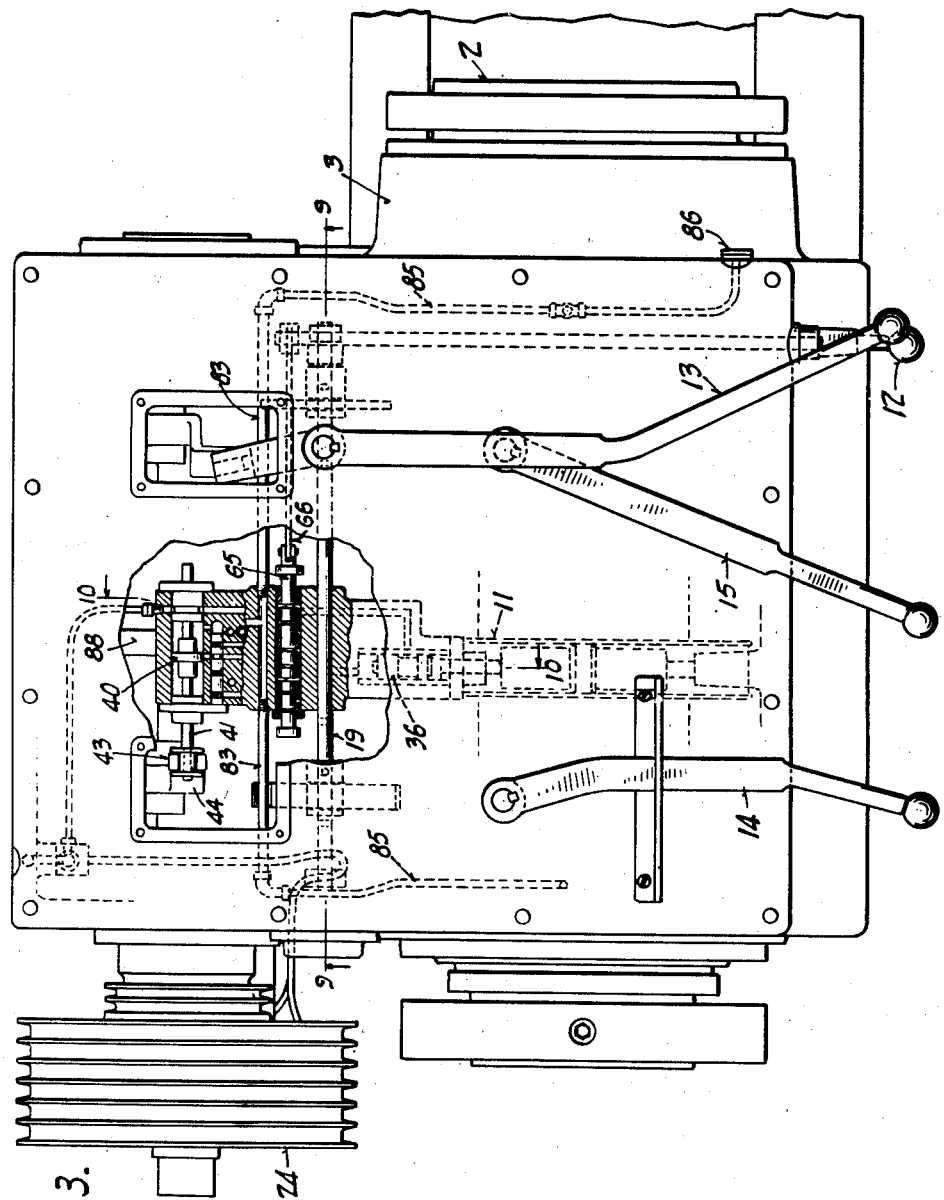
Fig. 3 is a top plan view of the headstock with parts broken away and sectioned to show the control valves.
Figure 4:
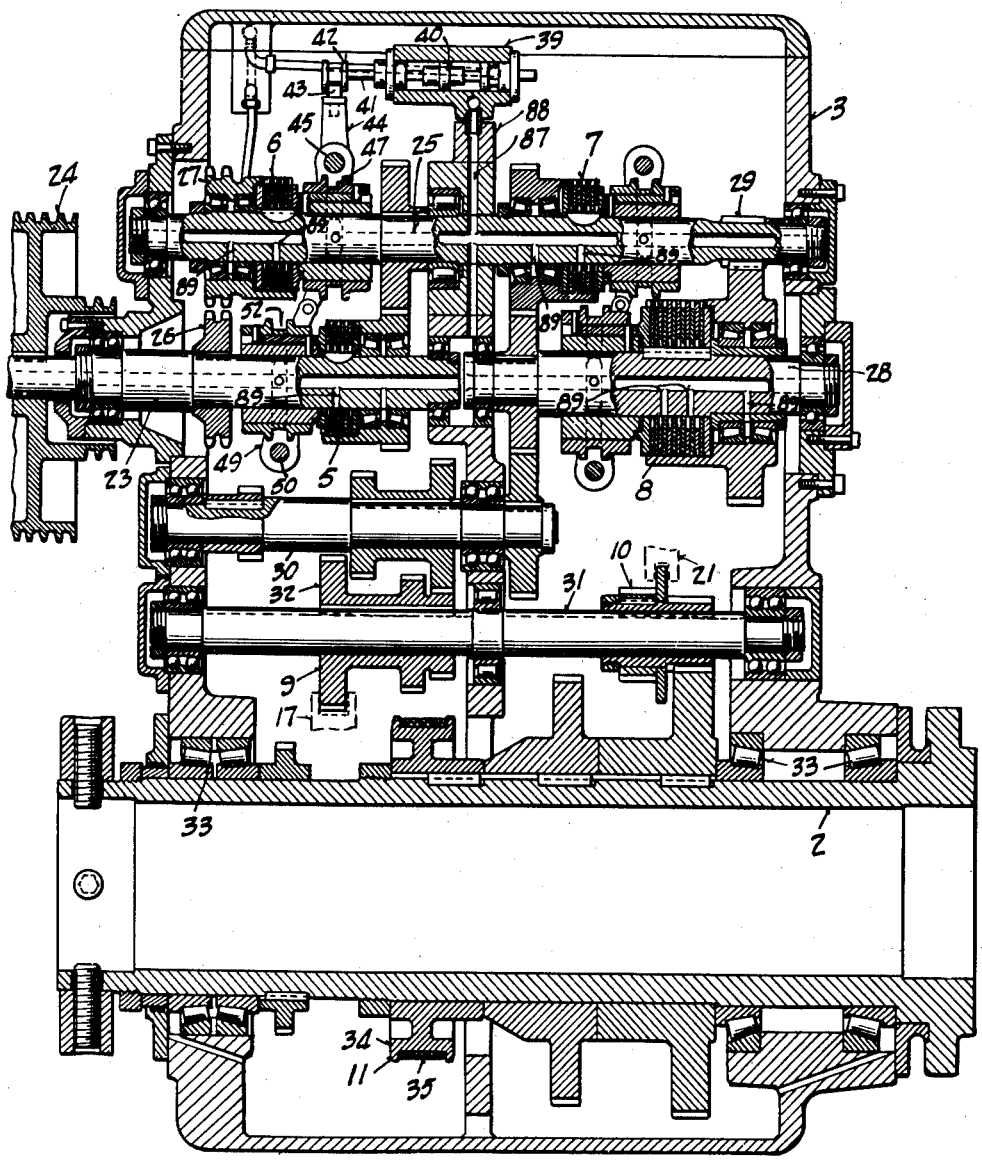
Fig. 4 is a developed longitudinal section showing the clutches and the brake mechanism in the headstock.

The arrangement and detail construction of the clutches and gears in the headstock is relatively unimportant. As shown in Figs. 2 and 4, the drive shaft 23 is driven by external pulley 24 from motor 4 and has the forward clutch 5 mounted thereon for driving the shaft 25 through suitable gearing. A chain sprocket 26 is also keyed on shaft 23 and serves to drive a similar sprocket 27 on the floating member of reverse clutch 6, the other member of clutch 6 being fixed on shaft 25. The clutches 5 and 6 are operated alternatively with a neutral position in which neither clutch is engaged. Engagement of either clutch effects driving of shaft 25 in the respective forward or reverse direction corresponding to the clutch engaged.

Shaft 25 carries high speed clutch 7 which in turn drives shaft 28 through suitable gearing. Shaft 25 also carries a low speed gear 29 driving the floating member of low speed clutch 8, the other member of clutch 8 being fixed on shaft 28. The clutches 7 and 8 are operated alternatively to effect driving of shaft 28 at either a high or low speed, the direction of rotation of shaft 28 being governed by that of shaft 25.

Shaft 28 is geared to drive triple gear shaft 30 upon which is keyed three separate gears of different size engaged by the respective gears of the triple gear shifter transmission 9. The spline shaft 31 carries the shifter member 9 having three gears which selectively mesh with the respective gears on shaft 30, the element 9 being splined to shaft 31 to drive the same when meshing with one of said gears and being moved along the shaft to its several drive positions by shifter shoe 17 engaging gear 32 thereon.

Shaft 31 drives spindle 2 through the double gear shifter transmission 10 operated by shifter shoe 21 to superimpose upon the gear ratios previously provided a second selection of ratios.

The headstock illustrated provides twelve different speeds for spindle 2 in both forward and reverse directions. However, any desired number of speeds may be provided by changing the speed selection mechanism.

The spindle 2 is mounted in suitable bearings 33 in the headstock casing and carries the brake 11 comprising a brake drum 34 encircled by the brake band 35. The brake band 35 is tightened upon the drum 34 by means of the piston 36 operating in power cylinder 37, and is loosened upon the drum 34 by means of the springs 38 which oppose the movement of the piston under the influence of fluid pressure in the cylinder.

In accordance with the present invention, the operation of the brake is synchronized with that of the forward and reverse clutches so that the brake 11 is only operative to hold the spindle against rotation when both clutches 5 and 6 are released and lever 12 is in neutral position. When either clutch is engaged, the brake is released. The time lag between the functioning of the clutches and brake should be such as will prevent both being on simultaneously. This is accomplished by providing a fluid pressure control mechanism for operating the clutches and brake as illustrated in Figs. 11 and 12.

The control mechanism for operating clutches 5 and 6 by fluid pressure comprises in part the double-acting cylinder 39 and piston 40. The piston rod 41 secured to piston 40 carries a grooved collar 42 which receives a fork 43 secured to the reverse clutch shifter lever 44. The lever 44 is pivotally mounted on shaft 45 and carries shoes 46 engaging the clutch slider 47 for operating clutch 6. An arm 48 on lever 44 is connected by a yoke and pin to the forward clutch shifter lever 49 which in turn is pivoted on shaft 50 and carries shoes 51 engaging the clutch slider 52 for operating clutch 5.

Figure 11:
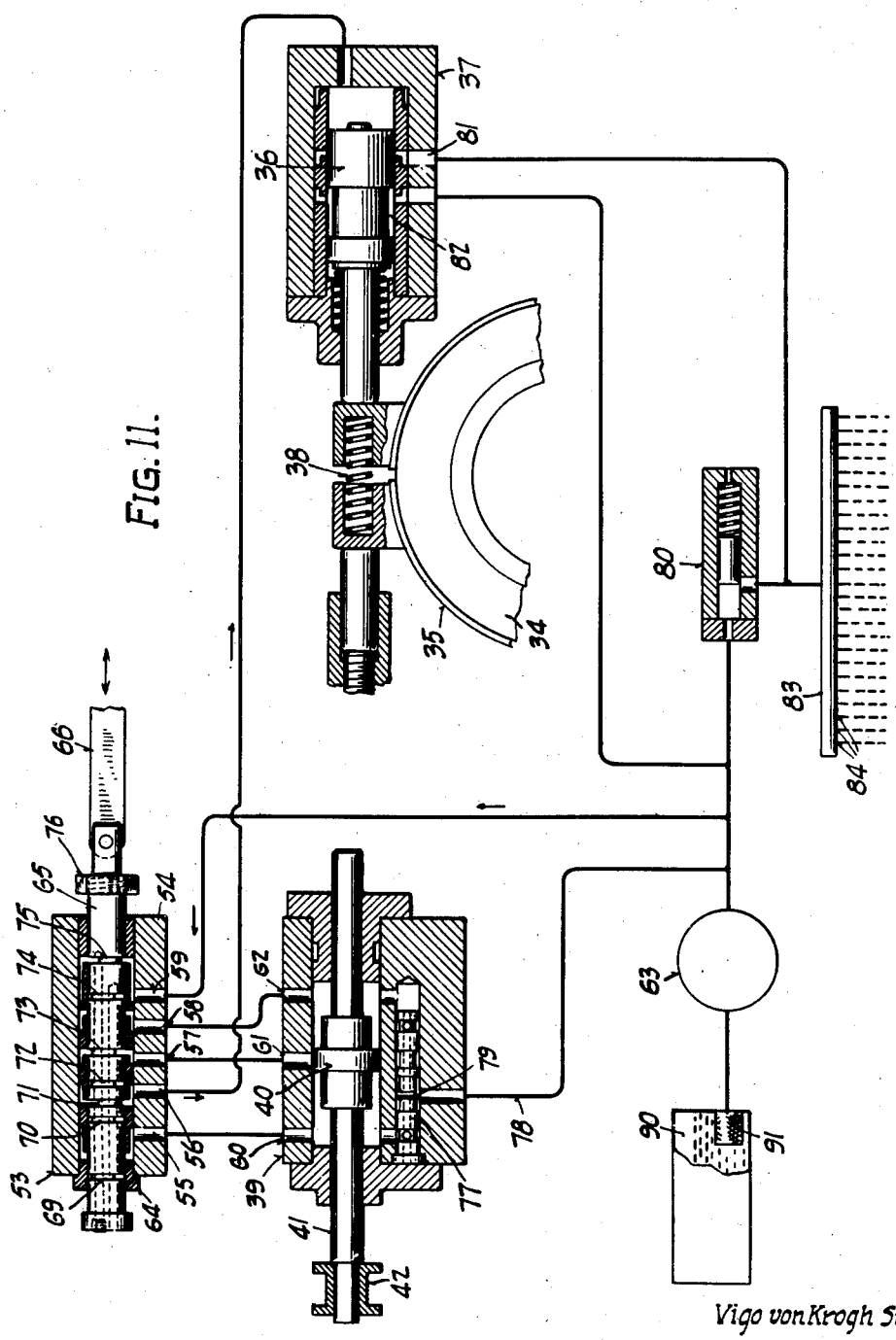
Fig. 11 is a diagrammatic view of the hydraulic system.

When piston 40 moves to the left end of cylinder 39 in Figs. 11 and 12, the collar 42 moves levers 44 and 49 in a direction effecting a movement of clutch sliders 47 and 52 in Fig. 4 to the right, thereby engaging the forward clutch 5 while clutch 6 is disengaged. When piston 40 moves to the right end of cylinder 39 in Fig. 12, the clutch sliders 47 and 52 move to the left in Fig. 4 and effect engagement of clutch 6 while clutch 5 is disengaged. Movement of piston 40 to the central position in cylinder 39 effects the release of both clutches. This latter position is neutral, since there is no effective drive of spindle 2 while clutches 5 and 6 are both released.

The operation of brake piston 36 and of clutch piston 40 is effected through the master control valve 53 operated by lever 12 and which control valve comprises the second part of the fluid pressure control mechanism. The valve 53 comprises a tubular cylindrical housing 54 having five lateral ports 55, 56, 57, 58 and 59 through its wall.

The forward relief port 55 is connected by a conduit to a port 60 in the left-hand end of cylinder 39. The brake port 56 is connected by a conduit to the power end of brake cylinder 37. The neutral relief port 57 is connected by a conduit to a central port 61 in cylinder 39. The reverse relief port 58 is connected by a conduit to a port 62 in the right-hand end of cylinder 39. And the supply port 59 is connected by a conduit to a source of fluid pressure such as pump 63. A port sleeve 64 is secured within the housing 54 and contains a passage therethrough for connecting with each of the ports in the housing. The valve piston 65 reciprocates in sleeve 64 and connects the several ports in a manner effecting the desired operation of the clutches and brake. For this purpose, lever 12 is connected to the end of valve piston 65 by link 66.

The valve piston 65 has two longitudinally extending passages 67 and 68 therein. Passage 67 is closed at its ends while passage 68 has one end open to provide for the free escape of oil therefrom. Piston 65 also has seven circumferential grooves 69, 70, 71, 72, 73, 74 and 75 cut therein. Grooves 71 and 75 are cut sufficiently deep on one side of the piston to connect with the longitudinal passage 67 while the remaining grooves 69, 70, 72, 73 and 74 connect with passage 68.

When the valve is in neutral position, as shown in Figs. 11 and 12, the fluid enters port 59 under pressure and passes around piston 65 in groove 75 to passage 67, thence to groove 71 and out through port 56 to the brake cylinder 37 where it moves brake piston 36 to the left to tighten the brake band 35 on drum 34. In this position the neutral escape groove 73 connects passage 68 with port 57 and allows the escape of fluid through the open end of passage 68 from the central port 61 in cylinder 39. This in turn maintains piston 40 centrally of cylinder 39 where it effectively covers port 61 and holds clutches 5 and 6 disengaged.

When valve piston 65 is moved to the left until end flange 76 engages the end of housing 54, port 56 is disconnected from groove 71 and connected to groove 72, thereby allowing pressure fluid to escape from brake cylinder 37 through passage 68. Port 57 is also closed and groove 74 connects port 58 with passage 68 thereby allowing oil to escape from the right-hand end of cylinder 39.

Figure 5:
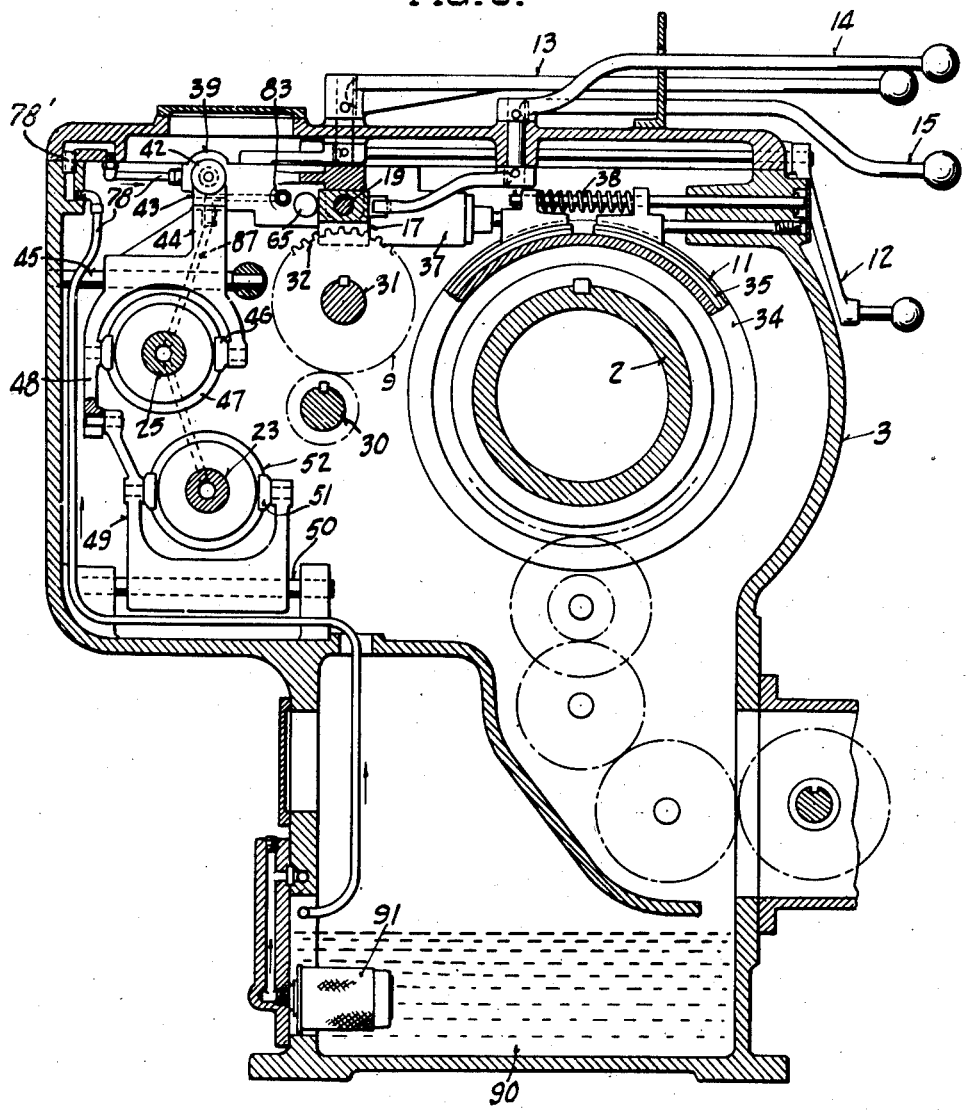
Fig. 5 is a transverse vertical section through the headstock showing the forward and reverse clutch mechanism.
Figure 6:
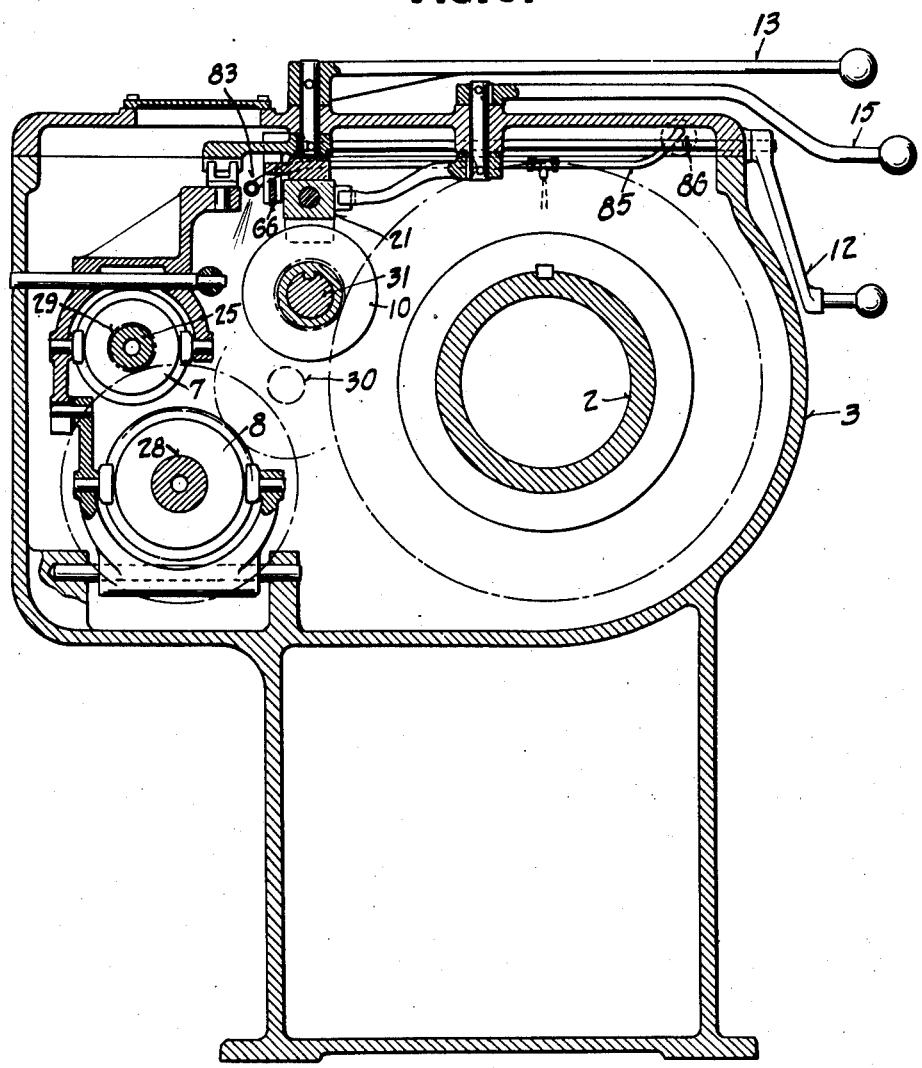
Fig. 6 is a similar section showing the high and low speed clutches.

The movement of piston 40 in cylinder 39 is effected through an auxiliary control valve 77 in the wall of the cylinder. The valve 77 controls the inlet of fluid pressure to the opposite ends of cylinder 39 and preferably comprises a T-passage with its central portion connected by a conduit 78 to the pressure side of pump 63 and its upper branches connected respectively to the opposite ends of cylinder 39. Conduit 78 comprises a pipe line from pump 63, a passage through the headstock casing at the upper end, a passage through the cover plate and a pipe line therefrom to cylinder 39, as shown in Fig. 5. The sealed slip joint 78' is provided between the cover plate and headstock casing to connect the passage of conduit 78 when the cover plate and casing are assembled. Flow of pressure fluid through the respective upper branches of the T-passage is controlled by an automatic control disc 79 which floats between the opposed mouths of the branch passages and seats on one or the other to prevent oil flow therethrough. The disc 79 has a minute hole through its center to prevent sticking from suction when seated.

When, as previously assumed, piston 65 is moved to the left and connects the right-hand end of cylinder 39 to the exhaust passage 66, oil flows freely through conduit 78 through the central and right-hand portions of the T-passage of valve 77 and thence into the right-hand end of cylinder 39 and out through port 62, port 58, groove 74 and passage 68. The rapid escape of oil from the pressure line through the right-hand portion of the T-passage draws disc 79 to the right where it seats on the end of the T-branch and stops the escape of oil mentioned. The pressure then builds up through the left branch of the T-passage and in the left-hand end of cylinder 39 to force piston 40 to the right, thereby engaging reverse clutch 6.

When valve piston 65 is moved to the right to forward position, groove 69 connects port 55 with passage 68 thereby allowing the escape of oil from the left-hand end of cylinder 39 while closing the escape from the right-hand end. This effects flow of oil past disc 79 and into the left branch of the T-passage, and disc 79 then moves to the left and closes the left branch, allowing pressure to build up in the right-hand end of cylinder 39 moving piston 40 to the left where it effects engagement of forward clutch 5.

When valve piston 65 is subsequently moved to neutral position, it closes the escape of fluid from both ends of cylinder 39 and allows escape through the central port 61. This allows escape of oil from the right of piston 40 and effects movement of disc 79 to the right, allowing the pressure fluid to move piston 40 to the right. When piston 40 closes off the escape of fluid through port 61, the relative non-compressibility of the fluid in the right-hand end of cylinder 39 will oppose further movement of piston 40 and the latter will be held in the center between substantially equalized fluid pressures in the opposite ends of cylinder 39.

In order to adjust the time lag required between operation of brake 11 and of clutches 5 and 6 the ports 55, 56 and 58 may contain adjustable needle valves, as shown in Fig. 12.

The pump 63 supplies the necessary fluid pressure for operating clutches 5 and 6 and for holding on brake 11. Excess oil being pumped is allowed to escape through an adjustable pressure relief valve 80 to the oiling system for the headstock. When the brake is on, the pressure maintained by valve 80 may be of the order of four hundred pounds per square inch. When the brake is released this pressure is preferably reduced by a by-pass 81 through a valve 82 operated by the brake piston 36 and which also functions as a pressure relief valve. This prevents the heating of the oil caused by maintaining the high pressure and forcing the oil through the relatively small passage in the relief valve 80 when the clutches are engaged and the machine is operating.

The relatively low oil pressure maintained during operation of the drive is sufficient to move the clutch operating piston 40 and to initially move brake piston 36 against its holding springs 38 a sufficient distance to close by-pass valve 82, after which the pressure immediately builds up to that for which relief valve 80 is set.

The fluid pressure control mechanism comprising cylinder 39 and its piston 40 and the master control valve 53 and also levers 13, 14 and 15 are removable with the cover plate of the headstock, there being a sealed slip joint connection in conduit 78 to separate the same when the cover plate is removed.

The oiling system for the headstock comprises cascade tube 83 extending horizontally above the several shafts and clutches and gears. The tube 83 is connected at its center to the outlets from the relief valve 80 and the by-pass valve 82, and the tube has one or more rows of holes 84 through its wall to effect a spraying of the clutches and gears with oil.

An oil conduit 85 leads from each end of the cascade tube 83 to supply the spindle bearings 33 with oil. The right-hand conduit 85 extends to the front of the housing for headstock 3 where it supplies oil to an oil gauge 86.

The clutches and their bearings are additionally oiled from the inside by the passage 87 in the central cross member 88 of the housing connecting the inlet of the cascade tube 83 with the inside of hollow shafts 23, 25 and 28. The oil passes longitudinally in the hollow shafts and is discharged into the clutch discs and bearings through holes 89 in the shafts. In this way, oil is fed to the inside of the clutch discs and a more certain and uniform oiling of the discs is obtained than would be the case if oil was only applied to the outer edges of the discs. Centrifugal action tends to throw the oil outwardly between the discs.

The constant supply of oil to the discs, in relatively large quantities, keeps the clutches cool and at a more uniform temperature.

Oil spraying from the cascade tube 83 and dripping from the clutches and bearings, and the oil discharged from the open end of passage 68 in the master control valve, flows to the bottom of the housing where it collects in the oil reservoir 90. It is then again pumped through the system by pump 63 after passing through a suitable oil filter 91.

The oil serves three general purposes in carrying out the present invention: (1) it serves as a power fluid for actuating the brake and the forward and reverse clutches, (2) it serves to lubricate the headstock, and (3) it serves to keep the clutches cool and prevents undue heating of the same.

Various embodiments of the invention may be employed within the scope of the accompanying claims.

I claim:

1. In a headstock for lathes and the like having a spindle and a transmission drive therefor, a fluid pressure system for controlling said transmission and comprising, a fluid suply reservoir, a pressure pump for said fluid, a fluid pressure actuated brake, a fluid pressure actuated clutch, means to conduct pressure fluid from said pump selectively to said brake and clutch, a pressure relief valve for maintaining a relatively high pressure in said conducting means when said brake is actuated to braking position, and a by-pass for said valve to reduce the pressure in said conducting means when said brake is released and said clutch is actuated.

2. In a headstock for lathes and the like, a spindle, a source of power, a transmission for driving said spindle from said source of power and including a fluid pressure actuated transmission control, an oil supply reservoir at the bottom of said headstock, a pressure pump for pumping oil from said reservoir to said control, a pressure relief valve for maintaining a predetermined operating pressure in the oil going to said control, a by-pass for said relief valve operable to reduce the operating pressure for said control, a valve for said by-pass operable in synchronism with said transmission, and a cascade disposed above said transmission and connected to said valves for receiving oil from the valves and spraying it over said transmission as it returns to said oil reservoir.

3. In a headstock for lathes and the like having a spindle and a transmission drive therefor, a brake and a fluid pressure system for controlling said transmission and comprising a brake actuating power cylinder having a piston connected to an element of the brake, a fluid reservoir, a constantly operating pump connected to receive fluid from said reservoir and provide pressure for operating said cylinder, a conduit for returning excess power fluid to said reservoir during operation of the cylinder, a pressure relief valve for maintaining a predetermined actuating pressure in said cylinder when said cylinder and piston actuates the brake, and a by-pass with a valve therein actuated by the movement of said piston for circumventing said cylinder and pressure relief valve when said cylinder is released from actuation to provide for free circulation of fluid under the influence of said pump.

4. In a headstock for lathes and the like having a spindle and a transmission drive therefor, a fluid pressure system for alternatively operating clutch and brake mechanism in said transmission, comprising a fluid supply reservoir, a pressure pump for said fluid, a fluid pressure actuated brake, a fluid pressure actuated clutch, a control valve for supplying pressure fluid through passages from said pump selectively to said brake and clutch, and members in the pressure fluid passages adjustably restricting the same to provide a time lag in the operation of the clutch and brake and prevent simultaneous operation of the same.

5. In a headstock for lathes and the like, a housing, a spindle mounted for rotation in bearings supported in the opposite walls of said housing, a change speed gear transmission in said housing disposed laterally of said spindle for driving the same from a source of power, a central transverse upright partition in said housing and having bearings for supporting rotary parts of said transmission, a fluid pressure system for controlling the operation of said transmision and utilizing lubricant fluid, said system having pressure relief discharge means carried by said partition above said transmission to cascade lubricant thereon, and connections for directing lubricant from the system laterally to said spindle bearings.

6. In a headstock for lathes and the like having a spindle with a speed change transmission drive therefor and fluid pressure means controlling said transmission, a brake band encircling said spindle and having upstanding shoes at its opposite ends, means normally biasing said shoes apart to loosen the grip of said band upon the spindle, an adjustable abutment supporting one of said shoes against said biasing action, a power cylinder having a piston bearing against the other of said shoes to operate the brake, and means connecting said cylinder to said fluid pressure means to operate the same in synchronism with said transmission.

7. In a headstock for lathes and the like having a rotary spindle and a brake therefor, a fluid pressure system comprising a power cylinder, a piston operable in said cylinder and connected to the brake for operating the same, a fluid supply reservoir, a pressure pump adapted to receive fluid from said reservoir, a control valve selectively effecting passage of fluid pressure from said pump to said cylinder to actuate said piston and effect braking operations, a high pressure relief valve connected in the passage between said pump and cylinder and discharging to said reservoir, and a by-pass for said relief valve operable by the brake release actuation of said piston to substantially reduce the back pressure on said pump when the brake is released and thereby prevent overheating of the fluid.

8. In a headstock for lathes and the like having a rotary spindle, a multiple speed transmission for driving said spindle at a plurality of selected speeds, means for shifting said transmission and a brake for stopping said spindle, a fluid pressure system comprising a pressure pump, control mechanism operated by fluid pressure from said pump in response to manual speed selections for actuating said shifting means, a power cylinder having a piston connected to actuate said brake, a conduit for conducting pressure fluid from said control mechanism to said power cylinder to operate the latter in synchronism with said shifting means, a pressure release valve connected on the pressure side of said pump for determining the maximum operating pressure for said power cylinder, and a second relief valve operable to by-pass said first named relief valve and reduce the fluid pressure when said brake is released by said power cylinder.

9. In a headstock for lathes and the like having a rotary spindle, a casing having an open top, a cover plate for said top, a multiple speed selective transmission housed in said casing, fluid pressure actuated shifting means for said transmission, and manual control means for said shifting means, said shifting means and control means being secured to said cover plate and removable therewith.

10. In a headstock for lathes and the like having a rotary spindle, a casing having an open top, a cover plate for said top, a multiple speed selective transmission housed in said casing, a fluid pressure actuated shifting means for said transmission secured to the inside of said cover plate and removable therewith, and a conduit for supplying fluid pressure to said fluid pressure means, said conduit extending from said casing to said cover plate and having a sealed slip joint therein for separating the same upon removal of the cover plate.

VIGO von KROGH SUNDT.

REFERENCES CITED

The following references are of record in the file of this patent:

UNITED STATES PATENTS

| Number | Name | Date |
|--------|------|------|
| 917,294 | Harrington | Apr. 6, 1909 |
| 1,611,810 | Bradley | Dec. 21, 1926 |
| 1,795,018 | Foster | Mar. 3, 1931 |
| 1,824,700 | Williamson | Sept. 22, 1931 |
| 1,864,126 | Ferris | June 21, 1932 |
| 1,904,971 | Ernst et al. | Apr. 18, 1933 |
| 1,928,301 | Pierson | Sept. 26, 1933 |
| 1,938,780 | Nenninger et al. | Dec. 12, 1933 |
| 1,953,568 | Rose | Apr. 3, 1934 |
| 1,993,247 | Penati | Mar. 5, 1935 |
| 1,998,811 | Heaton | Apr. 23, 1935 |

(Other references on following page)

| Number | Name | Date | Number | Name | Date |
|---|---|---|---|---|---|
| 2,012,082 | Hieber et al. | Aug. 20, 1935 | 2,153,469 | Macfarlane | Apr. 4, 1939 |
| 2,012,083 | Schellenbach | Aug. 20, 1935 | 2,167,790 | Whitehead et al. | Aug. 1, 1939 |
| 2,012,084 | Hoelscher et al. | Aug. 20, 1935 | 2,232,620 | Meeks | Feb. 18, 1941 |
| 2,012,398 | McKenzie | Aug. 27, 1935 | 2,243,364 | Trautman | May 27, 1941 |
| 2,014,195 | McCollum | Sept. 10, 1935 | 2,253,663 | Tweedale | Aug. 26, 1941 |
| 2,018,014 | Fahrney | Oct. 22, 1935 | | | |
| 2,023,597 | Klocke et al. | Dec. 10, 1935 | | | |
| 2,050,245 | Carter | Aug. 11, 1936 | | | |
| 2,050,520 | Carter | Aug. 11, 1936 | | | |
| 2,054,141 | Senger | Sept. 15, 1936 | | | |

FOREIGN PATENTS

| Number | Country | Date |
|---|---|---|
| 188,323 | Great Britain | Jan. 28, 1924 |